United States Patent
Ukon et al.

(10) Patent No.: US 12,088,689 B2
(45) Date of Patent: Sep. 10, 2024

(54) DATA ACQUISITION DEVICE AND DATA ACQUISITION METHOD

(71) Applicant: NTT Advanced Technology Corporation, Tokyo (JP)

(72) Inventors: Yuta Ukon, Tokyo (JP); Masaru Katayama, Tokyo (JP); Akihiko Miyazaki, Tokyo (JP)

(73) Assignee: NTT Advanced Technology Corporation, Kawasaki (JP)

( * ) Notice: Subject to any disclaimer, the term of this patent is extended or adjusted under 35 U.S.C. 154(b) by 0 days.

(21) Appl. No.: 18/098,903

(22) Filed: Jan. 19, 2023

(65) Prior Publication Data

US 2023/0239379 A1  Jul. 27, 2023

(30) Foreign Application Priority Data

Jan. 21, 2022 (JP) ................. 2022-007754

(51) Int. Cl.
*H04L 69/22* (2022.01)
(52) U.S. Cl.
CPC .................. *H04L 69/22* (2013.01)
(58) Field of Classification Search
CPC ....................................................... H04L 69/22
See application file for complete search history.

(56) References Cited

U.S. PATENT DOCUMENTS

| | | | | |
|---|---|---|---|---|
| 8,458,267 | B2* | 6/2013 | Chen ................. | G06F 11/3409 709/206 |
| 2002/0114528 | A1* | 8/2002 | Tanaka ................. | H03M 7/40 382/245 |
| 2004/0249916 | A1 | 12/2004 | Graves et al. | |
| 2008/0267217 | A1* | 10/2008 | Colville ................. | H04L 47/38 370/477 |
| 2011/0208883 | A1* | 8/2011 | Moon ................. | G11C 7/1006 711/E12.001 |
| 2014/0281030 | A1 | 9/2014 | Cui et al. | |
| 2015/0200860 | A1* | 7/2015 | Kampeas ................. | H04L 43/08 370/235 |
| 2017/0118102 | A1 | 4/2017 | Majumder et al. | |
| 2017/0141974 | A1 | 5/2017 | Lahiri | |
| 2017/0163510 | A1 | 6/2017 | Arora et al. | |
| 2017/0180329 | A1* | 6/2017 | Lin ................. | H04L 63/0428 |

(Continued)

FOREIGN PATENT DOCUMENTS

| | | |
|---|---|---|
| JP | 2008104027 A | 5/2008 |
| JP | 2009105716 A | 5/2009 |
| JP | 2015233181 A | 12/2015 |

(Continued)

OTHER PUBLICATIONS

P4.org, "P4 Language Tutorial", 2018, <https://opennetworking.org/wp-content/uploads/2020/12/P4_D2_East_2018_01_basics.pdf>.

(Continued)

*Primary Examiner* — Bryan Y Lee

(74) *Attorney, Agent, or Firm* — Harness, Dickey & Pierce, P.L.C.

(57) ABSTRACT

A data acquisition device includes a valid data acquirer configured to acquire valid data from communication data based on an analysis parameter including an offset from a head of the communication data to the valid data and a data length of the valid data and output the acquired valid data.

6 Claims, 14 Drawing Sheets

(56) References Cited

U.S. PATENT DOCUMENTS

2021/0160213 A1* 5/2021 Dees .................. H04L 67/125
2021/0176149 A1   6/2021 Takano et al.

FOREIGN PATENT DOCUMENTS

| JP | 2016005285 A | 1/2016 |
| JP | 2016005286 A | 1/2016 |
| JP | 2016006608 A | 1/2016 |
| JP | 2016054419 A | 4/2016 |
| JP | 2017005449 A | 1/2017 |
| JP | 2018074511 A | 5/2018 |
| JP | 2019220862 A | 12/2019 |
| JP | 7131705 B2 | 9/2022 |
| JP | 7160189 B2 | 10/2022 |
| WO | WO-2006117831 A1 | 11/2006 |

OTHER PUBLICATIONS

Xilinx, "SDNet Packet Processor User Guide", Oct. 2017, <https://www.xilinx.com/support/documentation/sw_manuals/xilinx2017_3/UG1012-sdnet-packet-processor.pdf>.

Japanese Office Action dated Nov. 8, 2022, regarding Japanese Patent Application No. 2022-007754 with English translation.

Canadian Office Action dated Feb. 18, 2021 regarding Canadian Patent Application No. 3064541.

Office Action dated Aug. 6, 2021 regarding U.S. Appl. No. 16/709,601.

Japanese Office Action dated Oct. 5, 2021 regarding Japanese Patent Application No. 2018-117364 with English translation.

Office Action dated Dec. 27, 2021 regarding U.S. Appl. No. 16/709,601.

Japanese Notice of Allowance in counterpart JP Application No. 2022-007754, dated Jan. 24, 2023.

* cited by examiner

FIG. 10

| pattern | field1 | field2 | field3 | FIELD NAME |
|---|---|---|---|---|
| 1 | $A_h:A_l$ | $B_h:B_l$ | $C_h:C_l$ | src IPv4, dst ipv4, protocol |
| 2 | $D_h:D_l$ | $E_h:E_l$ | - | mpls label1, mpls label2 |
| ⋮ | | | | |

| no | field1 | field2 | field3 | PARAMETER |
|---|---|---|---|---|
| 1 | C0A80001 | C0A80101 | 06 | PARAMETER 1 |
| 2 | C0A80001 | C0A801 | 11 | PARAMETER 2 |
| ⋮ | | | | |

DATA ACQUISITION DEVICE AND DATA ACQUISITION METHOD

CROSS-REFERENCE TO RELATED APPLICATIONS

This application claims the benefit and priority of Japan Application No. 2022-007754, filed Jan. 21, 2022. The entire disclosure of the above application is incorporated herein by reference.

BACKGROUND OF THE INVENTION

Field of the Invention

An aspect of the present invention relates to a technology for a data acquisition device and a data acquisition method.

Description of Related Art

In recent years, virtualization technologies such as a software-defined network (SDN) or network functions virtualization (NFV) have advanced. With these advances in virtualization technologies, networks in which new protocols such as virtual extensible local area network (VXLAN), multi-protocol label switching (MPLS), and segment routing over IPv6 (SRv6) have been introduced. As networks become diverse, packet processing on various protocols is required in network devices.

To perform packet processing at high speeds, application specific integrated circuits (ASICs) have been used so far. However, since much time and cost are required for development of ASICs, this is not realistic for development of the various networks at present. To cope with rapid changes in networks, attention has been paid to packet processing in which a central processing unit (CPU) or a field-programmable gate array (FPGA) is used. With development of such a device, a packet processing program may be developed and the time or cost required for the development is less than that for an ASIC.

Program languages for efficiently developing packet processing programs have been proposed (for example, see Non-Patent Documents 1 and 2). Designers can simply design packet header analyzing functions or packet processing functions in accordance with networks or use purposes by using such program languages.

[Non-Patent Document 1] P4.org, "P4 Language Tutorial," 2018,

[Non-Patent Document 2] Xilinx, "SDNet Packet Processor User Guide," October 2017,

SUMMARY OF THE INVENTION

In order to allow a general network device to support a new protocol, packet header analyzing functions have to be additionally developed. However, even if the technologies disclosed in Non-Patent Documents 1 and 2 are used for development, it takes at least several days from specification examination to program generation. In additional general development, it is necessary to re-test entire systems to verify whether degradation occurs. Therefore, much time is required for a verification process. Thus, there is a problem that time and cost are required for development of the packet header analyzing function. Such a problem is not only a problem of packets but also a problem common to general communication data that has header information.

In view of the foregoing circumstances, an object an aspect of the present invention is to provide a technology capable of acquiring necessary data more easily in any protocol.

According to an aspect of the present invention, a data acquisition device includes a valid data acquirer configured to acquire valid data from communication data based on an analysis parameter including an offset from a head of the communication data to the valid data and the data length of the valid data and output the acquired valid data.

In the data acquisition device according to the aspect of the present invention, the valid data acquirer may acquire the valid data by dividing the communication data into a plurality of pieces of data and acquiring one piece of data among the plurality of divided pieces of data each including a region.

In the data acquisition device according to the aspect of the present invention, the valid data acquirer may perform a process of dividing the communication data into a plurality of pieces of data and acquiring one piece of data among the plurality of divided pieces of data each including a region. The valid data may be acquired by performing, once or a plurality of times, a process of further dividing the acquired one piece of data into a plurality of pieces of data and acquiring one piece of data among the plurality of divided pieces of data each including a region.

The data acquisition device according to the aspect of the present invention may further include a data masker configured to mask a bit of the communication data other than valid data. The valid data acquirer may acquire the valid data from the communication data masked by the data masker.

In the data acquisition device according to the aspect of the present invention, the valid data acquirer may acquire a plurality of pieces of valid data from one piece of communication data. The data acquisition device may further include an operation OR calculator configured to generate a valid header by performing operation OR calculation on the plurality of pieces of valid data.

The data acquisition device according to the aspect of the present invention may further include a data retentioner configured to retain the communication data and output the communication data to the data masker throughout a plurality of cycles.

According to another aspect of the present invention, a data acquisition method includes: acquiring valid data from communication data based on an analysis parameter including an offset from a head of the communication data to the valid data and a data length of the valid data by a data acquisition device; and outputting the acquired valid data by the data acquisition device.

According to the aspects of the present invention, it is possible to acquire necessary data more easily in any protocol.

BRIEF DESCRIPTION OF THE DRAWINGS

FIG. 10 is a diagram illustrating an example of an analysis pattern file used for an analysis pattern registration process of the header analyzer according to an embodiment (common to the first to fourth embodiments) of the present invention.

DETAILED DESCRIPTION OF THE INVENTION

Figure 1:
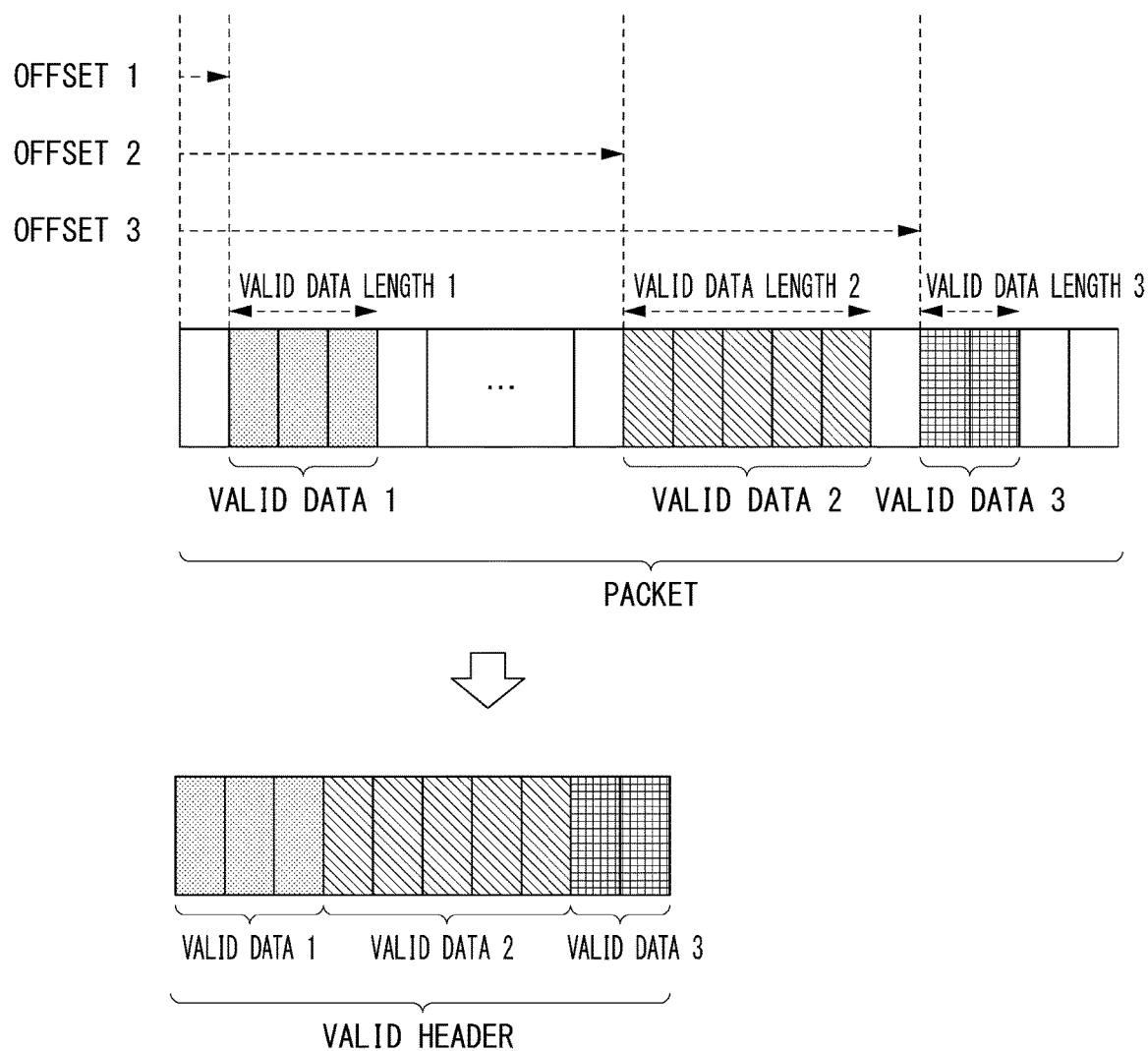
FIG. 1 is a diagram illustrating an overview of a header analyzing technology according to an embodiment of the present invention.

Hereinafter, embodiments of the present invention will be described with reference to the drawings. FIG. 1 is a diagram illustrating an overview of a header analyzing technology according to an embodiment of the present invention. The header analyzing technology according to an aspect of the present invention can be applied to any protocol data unit (PDU). In the embodiments of the present invention, some data (hereinafter referred to as "valid data") including data necessary in any PDU is acquired once or a plurality of times. When the valid data is acquired a plurality of times, each piece of valid data may be output or a valid header obtained by combining a plurality of pieces of valid data may be output. When the number of pieces of valid data is one, one piece of valid data is output. In the following description, a packet is used as a specific example of the PDU for description. Here, the PDU to which an aspect of the present invention can be applied may not be limited to a packet. For example, a frame may be used.

One or a plurality of analysis parameters are defined in accordance with a protocol to be applied. An analysis parameter includes two values of an offset and a valid data length. The offset is the data length between the head of data and the head of the valid data. The valid data length is a length of the data between the head of the valid data indicated by the offset and the tail of the valid data (the data length of the valid data).

In the example of FIG. 1, three analysis parameters are defined. A first analysis parameter is information indicating valid data 1 and is defined so that offset 1 and valid data length 1 are included. Offset 1 indicates the data length between the head of a packet and valid data 1, and valid data length 1 indicates the data length of valid data 1. Second and third analysis parameters also are offsets and valid data lengths of valid data 2 and valid data 3, respectively. Based on these analysis parameters, each piece of valid data is acquired and a valid header is generated by combining the acquired valid data.

The analysis parameters may be defined by, for example, a user or may be determined by, for example, another person. By setting the analysis parameters in a device that acquires the valid data, it is possible to perform a setting easily and quickly for acquiring the valid data in accordance with any protocol.

The valid data is, for example, information regarding an address such as a MAC address or an IP address and information such as a port number, a protocol number, a VLAN ID, a VNI, an MPLS label, a segment of SRv6, a TCP flag, a sequence number, or a payload. Here, the valid data is not limited to such specific examples. The valid header including the valid data can be used for various communication processes (for example, packet processing). For example, the valid data may be used for packet identification, network identification, cyberattack detection, jitter measurement, latency measurement, measurement of the number of connections, packet loss detection, or the like.

Figure 2:
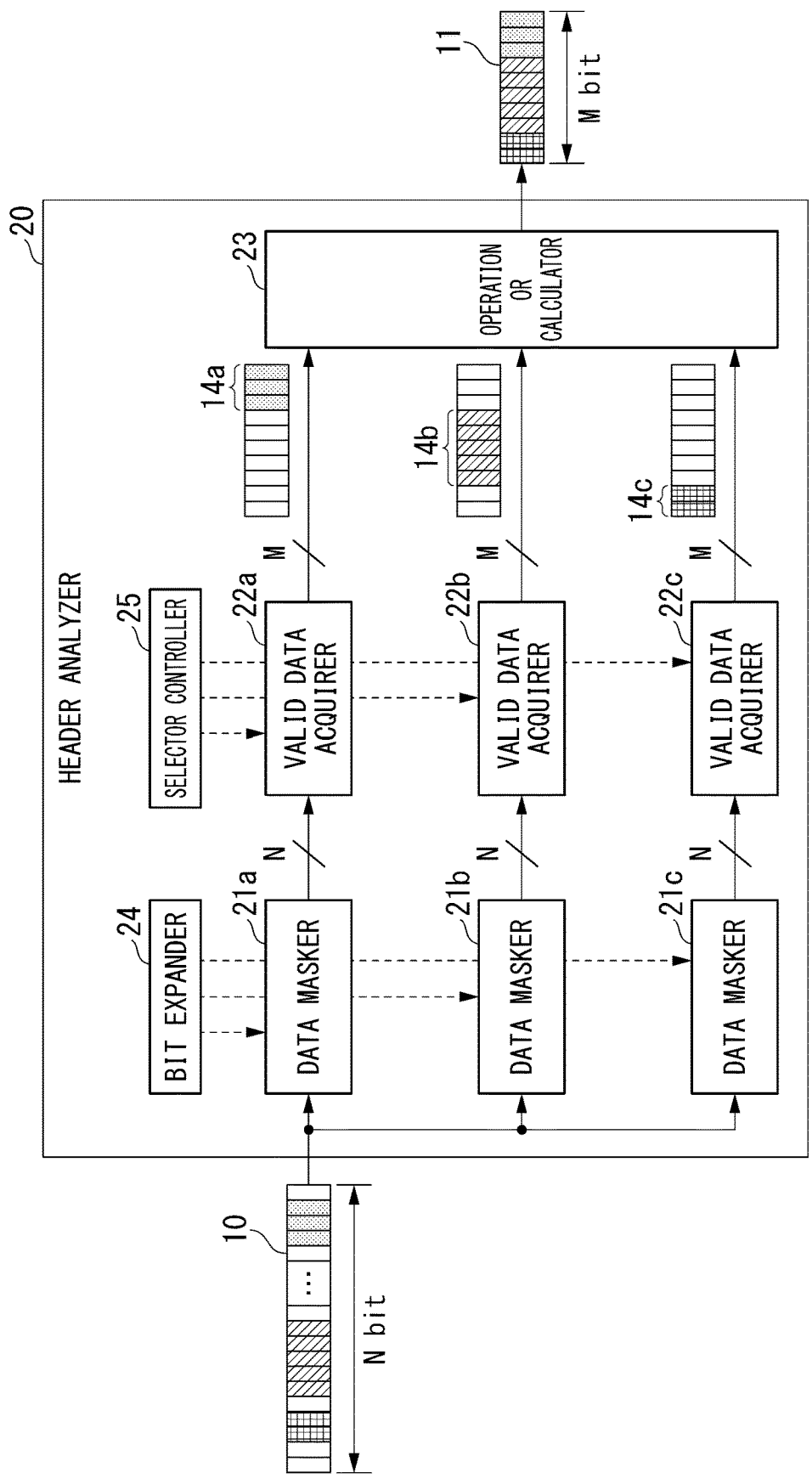
FIG. 2 is a block diagram illustrating an exemplary configuration of a specific example (a header analyzer) of a data acquisition device according to a first embodiment of the present invention.

FIG. 2 is a block diagram illustrating an exemplary configuration of a specific example (a header analyzer 20) of a data acquisition device according to the first embodiment of the present invention. The header analyzer 20 includes data maskers 21a to 21c, valid data acquirers 22a to 22c, an operation OR calculator 23, a bit expander 24, and a selector controller 25. The number of pieces of valid data which can be acquired once by the header analyzer 20 depends on the numbers of data maskers 21 and valid data acquirers 22.

The header analyzer 20 accepts an input of an N-bit packet 10 (analysis target communication data). The header analyzer 20 acquires valid data 14a to 14c from the input packet 10 and generates an M-bit valid header 11 (where N>M, and N and M are integers). By removing unnecessary information by this function, it is possible to expect an effect of reducing the amount of data transmitted to the rear stage or reducing the processing load of the rear stage.

A role of each block of the header analyzer 20 will be described. The data maskers 21 (21a to 21c) perform bit masking on the input packet 10 to mask unnecessary bits. For example, the data maskers 21 may mask the unnecessary bits by substituting the unnecessary bits with "0." The data maskers 21 may receive mask data (data used for masking: for example, data in which one "0" or a plurality of "0"s are lined up) from the bit expander 24. In such a configuration, it is possible to perform masking in which memory resources are not necessary.

The bit expander 24 expands reference data to generate mask data. For example, in the bit expander 24 that expands the reference data four times, mask data "0b1111_0000_0000_1111" is generated when reference data "0b1001" is input. A purpose of the bit expander 24 is to reduce memory resources of the header analyzer 20. The size of a general PDU (for example, a packet) is tens of bytes to 10 kilobytes, and thus the size of the mask data is a maximum of 10 kilobytes in many cases. Further, mask data according to the number of data maskers 21a to 21c is necessary. Memory resources are restrictive in hardware such as an FPGA. Therefore, when the mask data is retained as it is, the header analyzer 20 consumes many memory resources, which is likely to have an influence on mounting of other functions. Accordingly, mask data is generated by retaining reference data with a small data size and expanding the reference data in the bit expander 24. In such a configuration, it is possible to reduce memory resources of the header analyzer 20. In this case, the bit expander 24 includes a storage device (for example, a semiconductor storage device) and stores reference data set by a user or the like. As the magnification of data expansion of the reference data in the bit expander 24 is higher, the accuracy of the mask data deteriorates. In mask data with low accuracy, bits other than the valid data 14a to the valid data 14c are also likely to be excluded from a mask target. Accordingly, it is necessary to determine the magnification of the bit expander 24 in consideration of tradeoff between accuracy of the mask data and memory resources.

The valid data acquirers 22a to 22c acquire the valid data 14a to the valid data 14c from a masked packet, respectively. The acquired data includes a region (for example, a masked region) other than the valid data. This is because positions of the valid data 14a to the valid data 14c are adjusted so that the valid data does not overlap among the valid data acquirers 22a to 22c. A method of acquiring the valid data 14a to the valid data 14c will be described below.

The operation OR calculator 23 is a specific example of a combiner. The operation OR calculator 23 performs operation OR calculation on data acquired by the valid data acquirers 22a to 22c to generate a valid header 11. As described above, each piece of data input to the operation OR calculator 23 is adjusted so that the positions of the valid data 14a to the valid data 14c do not overlap each other. Therefore, the operation OR calculator 23 may simply perform operation OR calculation for each bit.

The selector controller 25 controls selectors of the valid data acquirers 22a to 22c based on the analysis parameters. By changing a setting of the selectors in accordance with the analysis parameters, it is possible to change the positions of the acquired valid data.

Figure 3:
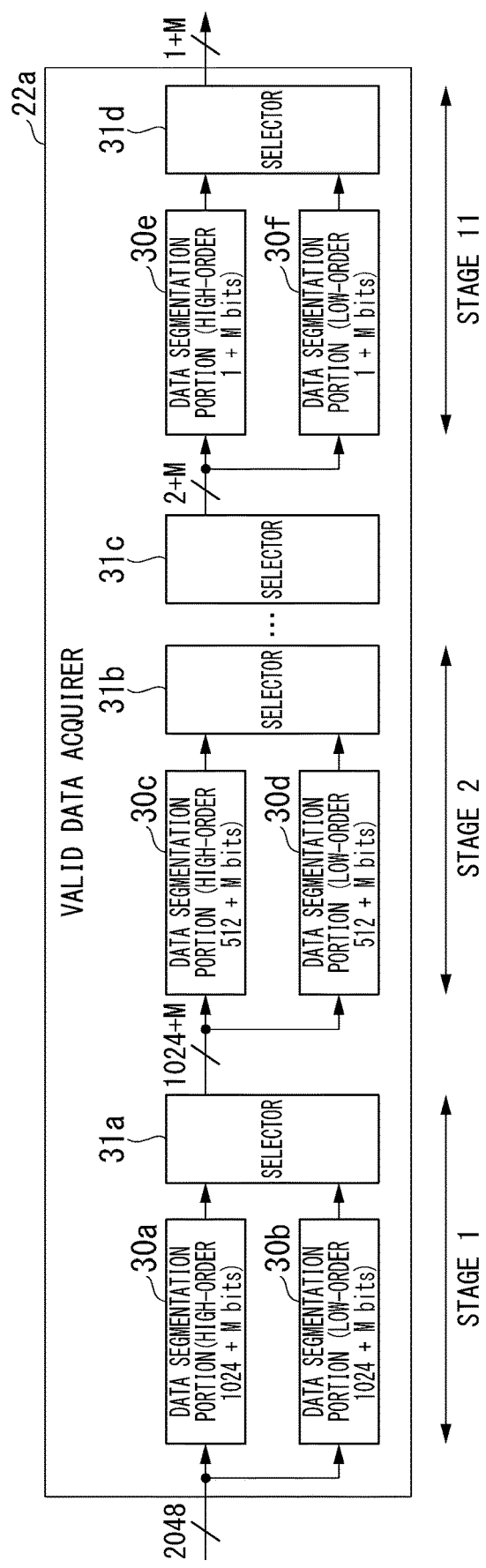
FIG. 3 is a block diagram illustrating an exemplary configuration of a valid data acquirer according to the embodiment of the present invention.

FIG. 3 is a block diagram illustrating an exemplary configuration of the valid data acquirer 22a according to the embodiment of the present invention. The valid data acquirer 22a includes a plurality of data segmentation portions 30 and a plurality of selectors 31. For example, the valid data acquirer 22a includes data segmentation portions 30a to 30f and selectors 31a to 31d. The valid data acquirer 22a is divided into a plurality of stages. For example, the valid data acquirer 22a is divided into eleven stages. One stage has two data segmentation portions 30 and one selector 31.

Roles of the data segmentation portions 30a to 30f are to acquire the first half or the second half of input data. Here, when the input data is simply divided into two divisions and valid data 27a to valid data 27c are on a division boundary line, missing occurs. Therefore, the data segmentation portions 30a to 30f acquire M bits (acquired data size) in surplus.

Operations of the data segmentation portions 30a to 30f and operations of the selectors 31a and 31d will be described using stage 1 as an example. As illustrated in FIG. 3, a packet size input to the valid data acquirer 22a is set to N=2048. For a small packet, high-order bits are buried with 0. At this time, the data segmentation portion 30a acquires data with the acquired data size (M bits) and high-order 1024 bits of an input packet. On the other hand, the data segmentation portion 30b acquires data with low-order 1024+M bits from the input packet. One of the data is selected by the selector 31a and the other of the data is sent to the subsequent stage. The selector controller 25 controls which data is selected by the selector 31a.

The valid data acquirer 22a in FIG. 3 can control segmentation positions in a packet with N=2048 bits in units of 1 bit by performing a process at eleven stages. However, this degree of control of high accuracy is unnecessary in some cases. When the number of stages is large, the processing delay increases and many calculation resources are necessary. Therefore, the number of stages is, of course, designed to an appropriate number. For example, the number of stages can be reduced as in the valid data acquirer 22a in FIG. 4. In the valid data acquirer 22a in FIG. 4, segmentation positions can be controlled in units of 64 bits. In such a configuration, the accuracy of the control deteriorates and data of an unnecessary portion is likely to be included more. However, it is possible to reduce the processing delay and calculation resources. For example, when FIG. 3 is compared with FIG. 4, the processing delay and calculation resources corresponding to six stages can be reduced in the case of FIG. 4.

Figure 4:
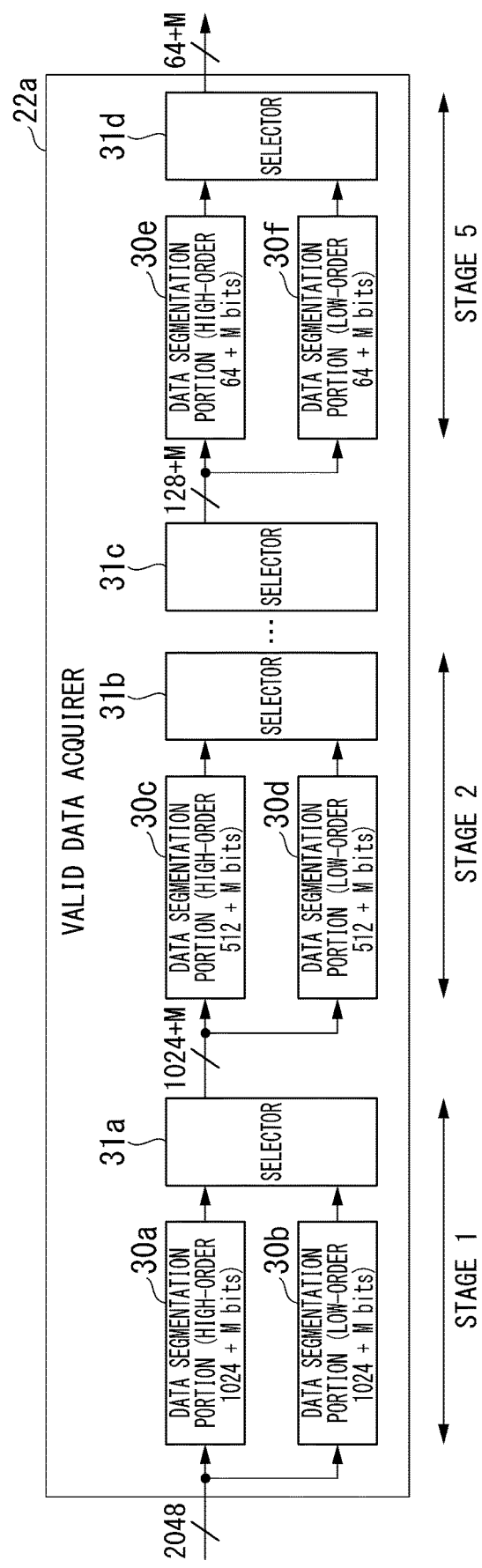
FIG. 4 is a block diagram illustrating an exemplary configuration of the valid data acquirer according to the embodiment of the present invention.
Figure 5:
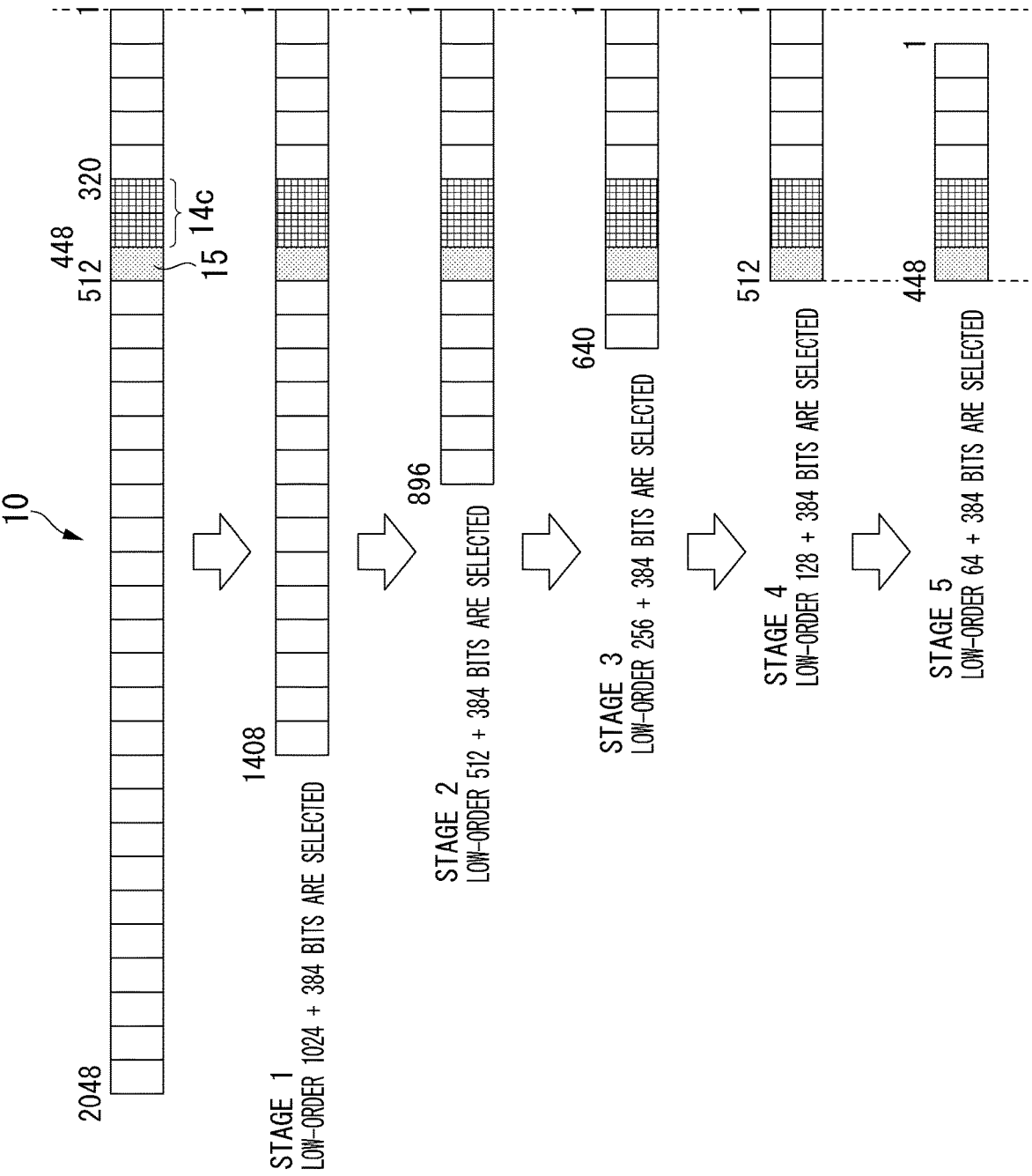
FIG. 5 is a diagram illustrating a specific procedure for acquiring valid data from a packet with N=2048 bits using the valid data acquirer in FIG. 4.

FIG. 5 is a diagram illustrating a specific procedure for acquiring the valid data 14c from the packet 10 with N=2048 bits using the valid data acquirer 22a in FIG. 4. The offset until the valid data 14c is set to 1600 bits and the data length is set to 128 bits. The acquired data size is set to 384 bits and the margin 15 is set to 64 bits.

In the data acquired at this time, the valid data 14c of 321st to 448th bits and the margin 15 of 449th to 512th bits have to remain. When the data remains at each stage, low-order data may remain at stages 1 to 4 and data of high-order bits are selected to remain at stage 5. In an output of stage 5, low-order 64 bits are surplus and may be deleted.

Sine the packet size, the offset, the data length, the data size, and the margin 15 are integers, a segmentation way in each stage is uniquely determined. Accordingly, the setting of the selectors 31a to 31d can be determined in advance.

Figure 6:
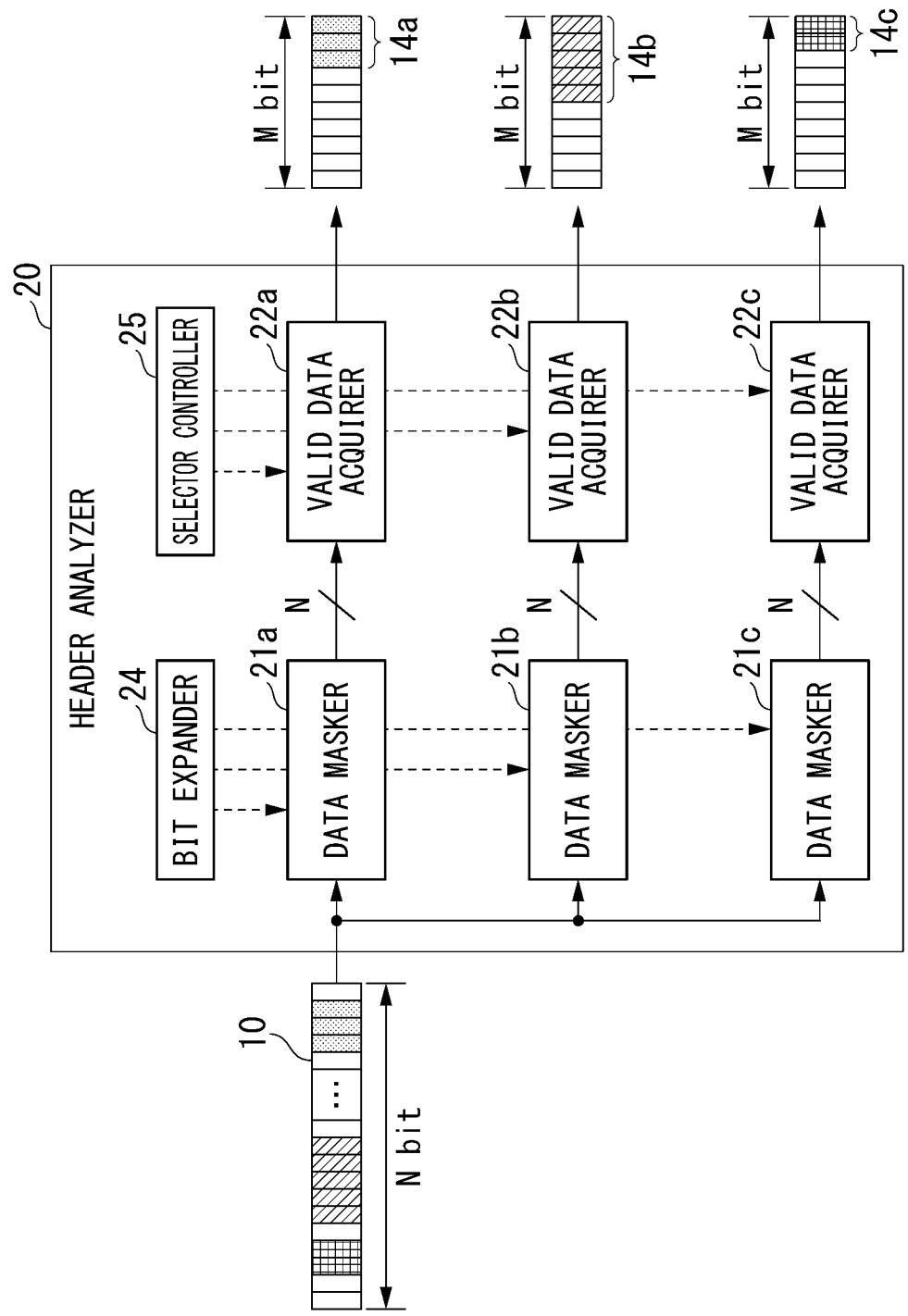
FIG. 6 is a block diagram illustrating a header analyzer according to a second embodiment of the present invention.

FIG. 6 is a block diagram illustrating the header analyzer 20 according to a second embodiment of the present invention. The header analyzer 20 according to the second embodiment is configured to output the valid data 14a to the valid data 14c. In this configuration, the operation OR calculator 23 is excluded from the configuration of FIG. 2.

Since the valid data acquirers 22a to 22c acquire the valid data 14a to the valid data 14c with various data lengths in the setting, an output of the header analyzer 20 includes mask data other than the valid data 14a to the valid data 14c in some cases. In this configuration, it is not necessary to adjust the positions of the valid data 14a to the valid data 14c among the valid data acquirers 22a to 22c. Therefore, the valid data 14a to the valid data 14c may be put aside a high-order or low-order positions of the output.

In this configuration, an output destination may be changed for each of the valid data 14a to the valid data 14c. Therefore, a module located at the rear stage of the header analyzer 20 can receive only necessary valid data.

Figure 7:
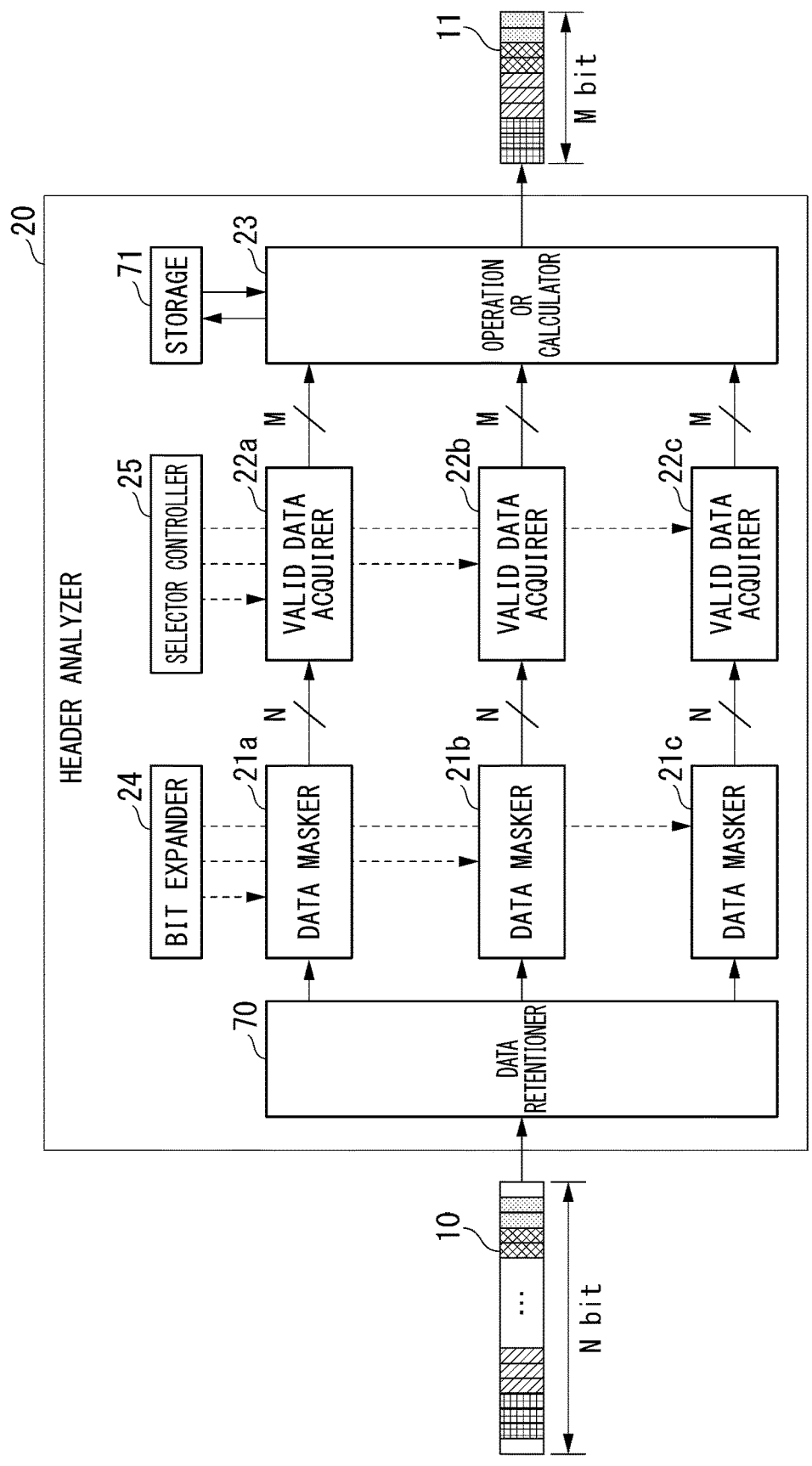
FIG. 7 is a block diagram illustrating a header analyzer according to a third embodiment of the present invention.

FIG. 7 is a block diagram illustrating the header analyzer 20 according to a third embodiment of the present invention. The header analyzer 20 according to the third embodiment is configured to output the valid header 11 through time-division processing. In this configuration, a data retentioner 70 and a storage 71 are added to the configuration of FIG. 2.

In this configuration, the data retentioner 70 retains the received packet 10. The data retentioner 70 repeatedly transfers the packet 10 retained at the rear stage at each cycle continuously during a plurality of cycles. The bit expander 24 and the selector controller 25 transmit mask data and a selector setting appropriate for each cycle to the data maskers 21a to 21c and the valid data acquirers 22a to 22c. Accordingly, the valid data acquirers 22a to 22c can acquire different valid data for each cycle. The operation OR calculator 23 performs a logical operation on the data output by the valid data acquirers 22a to 22c for each cycle, and each calculation result is retained in the storage 71. The operation OR calculator 23 performs the operational OR calculation on each calculation result retained in the storage 71 again, and generates and outputs the valid header 11. Through the foregoing operation, the header analyzer 20 can acquire the plurality of pieces of valid data without depending on the numbers of data maskers 21a to 21c and valid data acquirers 22a to 22c.

Figure 8:
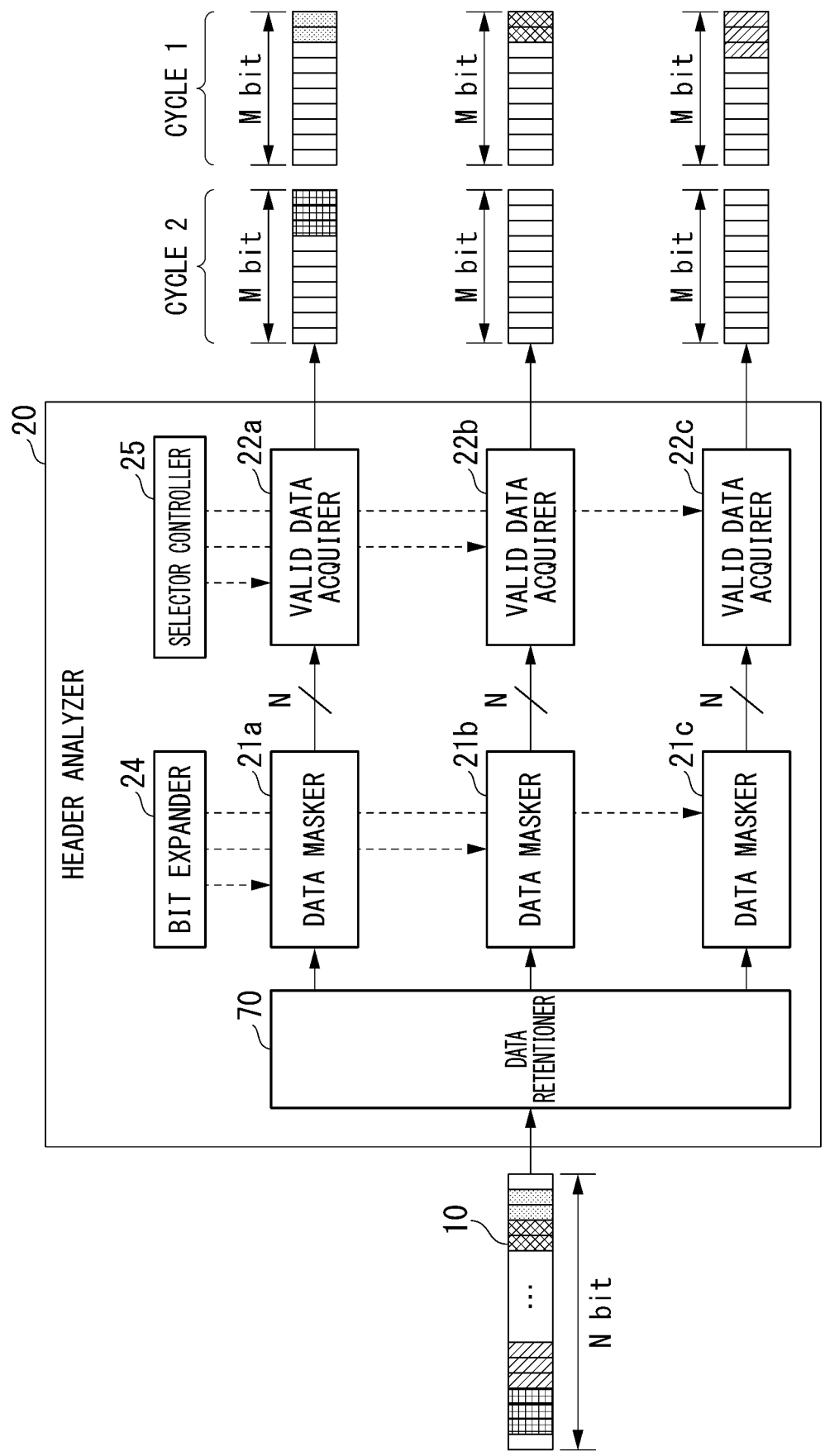
FIG. 8 is a block diagram illustrating a header analyzer according to a fourth embodiment of the present invention.

FIG. 8 is a block diagram illustrating the header analyzer 20 according to a fourth embodiment of the present invention. The header analyzer 20 according to the fourth embodiment is configured to output the valid data through time-division processing. In this configuration, a data retentioner 70 is added to and the operation OR calculator 23 is excluded from the configuration of FIG. 2.

A basic operation is the same as that of FIG. 7. Here, in the fourth embodiment, the valid data is output for each cycle without performing operation OR calculation. In the illustrated example, the three valid data acquirers 22a to 22c acquire the valid data from the input packet 10 and outputs three types of valid data at cycle 1. On the other hand, at cycle 2, there is no valid data to be acquired by the valid data acquirers 22b and 22c. Therefore, the valid data acquirers 22b and 22c output mask data (for example, data with all "0" s).

Figure 9:
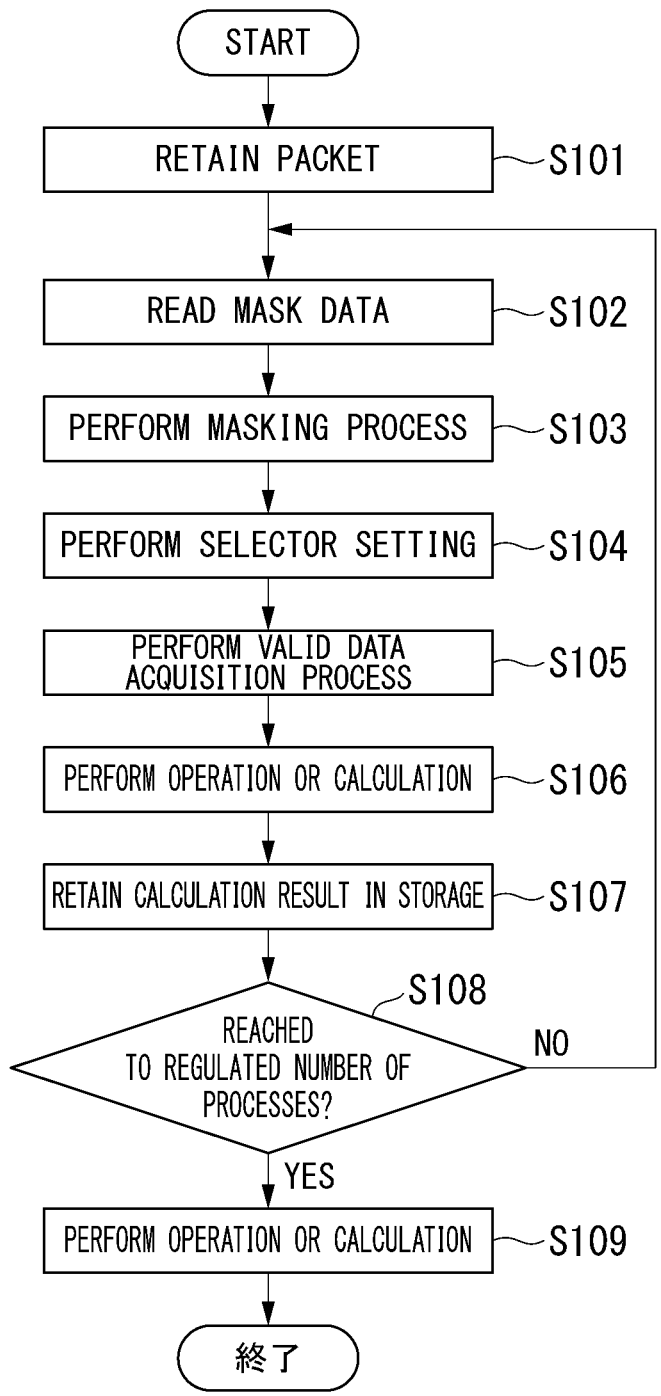
FIG. 9 is a flowchart illustrating a specific example of a process of the header analyzer according to the third embodiment of the present invention.

FIG. 9 is a flowchart illustrating a specific example of a process of the header analyzer 20 according to the third embodiment of the present invention. The header analyzer 20 retains the received packet 10 (step S101), reads a mask value, and performs a masking process on the packet 10 (steps S102 and S103). Thereafter, the header analyzer 20 performs the selector setting and performs a valid data acquisition process on the masked packet (steps S104 and S105). The header analyzer 20 performs operation OR calculation on the acquired data (step S106) and stores a result in the storage (step S107). The header analyzer 20 counts the number of valid data acquisition processes to determine whether the number of valid data acquisition processes reaches a regulated number of times (step S108). When the number of valid data acquisition processes does not reach the regulated number of times, the header analyzer 20 repeats the processes from steps S102 to S107. Conversely, when the number of valid data acquisition processes reaches the regulated number of times, the header analyzer 20 generates and outputs the valid header by performing the operation OR calculation on all the calculation results stored in the storage 71 (step S109).

When the time-division processing is not performed as in the header analyzer 20 according to the first and second embodiments, the regulated number of processes in step S108 is 1 and the processes of steps S101 and S109 are not necessary. When not the valid header but the valid data is output as in the header analyzer 20 according to the second and fourth embodiments, the processes of steps S106, S107, and S109 are not necessary.

FIG. 10 is a diagram illustrating an example of an analysis pattern file used for an analysis pattern registration process of the header analyzer 20 according to an embodiment (common to the first to fourth embodiments) of the present invention. This file has a pattern number 100 (pattern), analysis parameters 101a to 101c (fields 1 to 3), and a field name 102. The pattern number 100 corresponds to the header analyzer 20, and the analysis parameters 101a to 101c registered in each row are registered in the header analyzers 20 corresponding to these numbers.

The analysis parameters 101a to 101c are setting values of the data maskers 21a to 21c and the valid data acquirers 22a to 22c, respectively. Here, the valid data 12a to the valid data 12c and the data lengths 13a to 13c are designated with most significant bits (Ah, Bh, Ch, Dh, and Eh) and least significant bits (A1, B1, C1, D1, and E1) of the valid data 14a to the valid data 14c. For example, in the analysis parameter 101a (field 1) of the analysis pattern 100 (pattern 1), the offset is N-Ah and the data length is Ah-A1+1 when the packet length is set to N bits.

The field name 102 is used to cause names of the analysis parameters 101a to 101c and the valid data 14a to the valid data 14c to correspond to each other. Here, the names are partitioned by commas, but an expression way is not limited thereto. The types of valid data are unclear only with the analysis parameters 101a to 101c. However, referring to the field name 102, users or other applications can ascertain which header is analyzed. The specific content of the analysis parameters is not necessarily limited to the content illustrated in FIG. 10.

Figure 11:
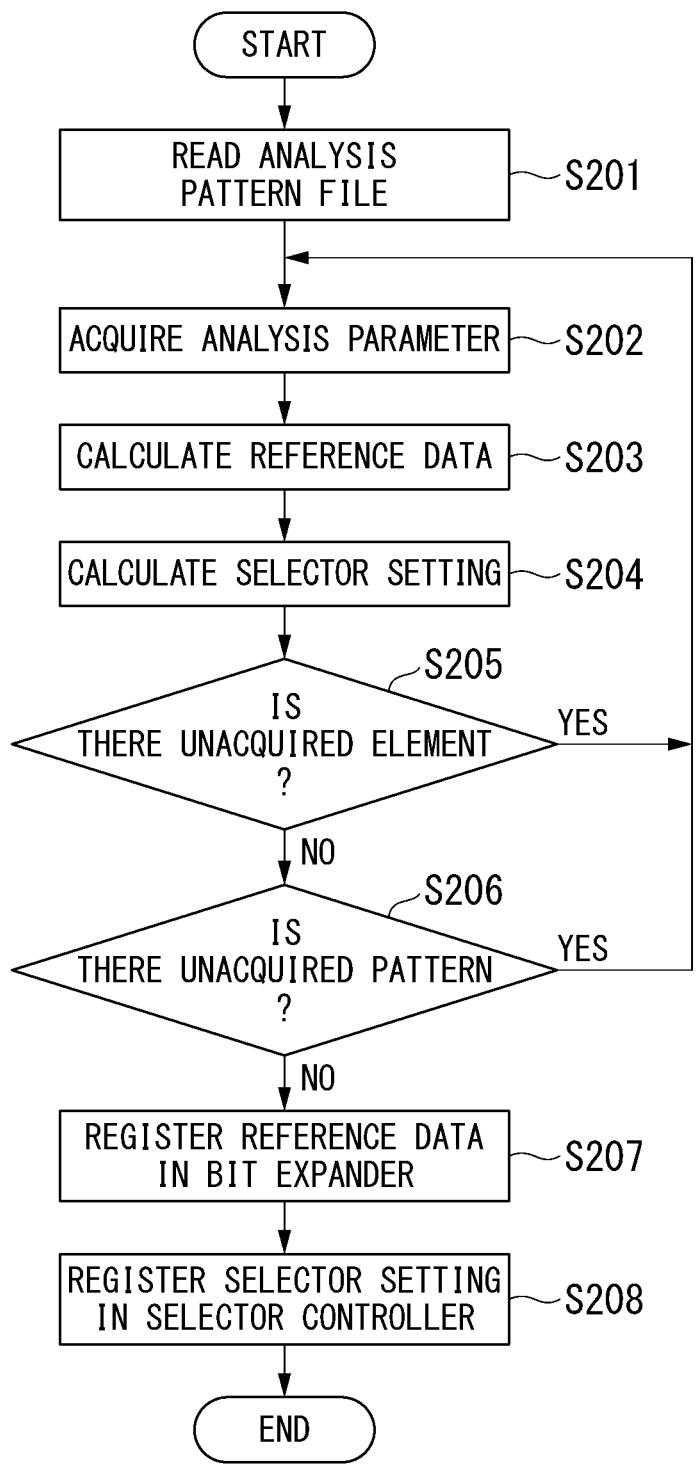
FIG. 11 is a diagram illustrating a specific example of an analysis parameter registration process for the header analyzer according to an embodiment (common to the first to fourth embodiments) of the present invention.

FIG. 11 is a diagram illustrating a specific example of an analysis parameter registration process for the header analyzer 20 according to an embodiment (common to the first to fourth embodiments) of the present invention. The process may be performed by a setting controller 126 to be described below or a function of the setting controller 126 may be mounted on another device. In this case, the setting controller 126 is configured using an information processing device.

The setting controller 126 reads an analysis pattern file (step S201) and acquires a first analysis parameter of pattern 1 (step S202). The setting controller 126 continuously calculates the reference data and the selector setting in accordance with the above-described method from the analysis parameter (steps S203 and S204). The setting controller 126 checks whether there is an unacquired analysis parameter (step S205). When there is the unacquired analysis parameter, steps S202 to S204 are repeated. When there is no unacquired analysis parameter, the setting controller 126 performs the same process on a subsequent pattern number. The setting controller 126 repeats the process until an unacquired pattern number disappears (step S206). Thereafter, the setting controller 126 registers the reference data and the selector setting in the header analyzer 20 corresponding to the pattern number (steps S207 and S208).

Figure 12:
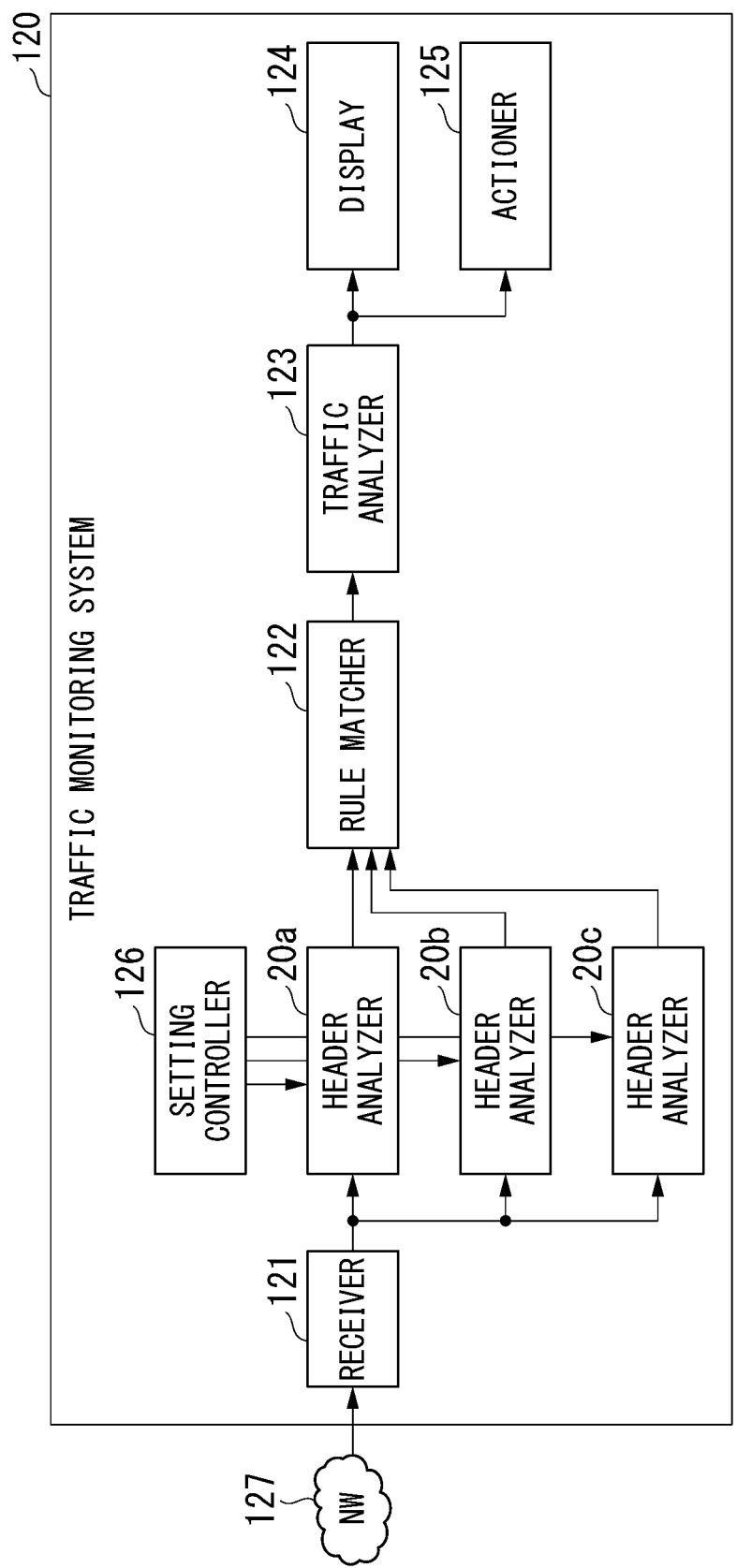
FIG. 12 is a block diagram illustrating a configuration of a traffic monitoring system which is a use case of the header analyzer according to the embodiment of the present invention.

FIG. 12 is a block diagram illustrating a configuration of a traffic monitoring system 120 which is a use case of the header analyzer 20 according to the embodiment of the present invention. The traffic monitoring system 120 includes a packet receiver 121, header analyzers 20a to 20c, a rule matcher 122, a traffic analyzer 123, a display 124, an actioner 125, and a setting controller 126. As illustrated in FIG. 12, the header analyzers 20 are arranged in parallel to perform a process in a plurality of analysis patterns. In the following description, a configuration in which each header analyzer 20 generates and outputs a valid header will be described as an example. However, each header analyzer 20 may be configured to output each piece of valid data rather than the valid header.

When the packet receiver 121 receives a packet from a network 127, the packet is analyzed by the header analyzers 20a to 20c to generate a valid header. The rule matcher 122 retrieves completely or partially matched rules using the valid header as a retrieval key and classifies packets for each rule. The traffic analyzer 123 performs processes such as measurement of the number of packets, measurement of the number of packet bytes, jitter measurement, latency measurement, measurement of the number of connections, measurement of the number of flows, and microburst detection. Such analysis results are visualized on the display 124 or are used as a trigger of an action such as an alert or an external device operation in the actioner 125.

An image output device such as a display is used in the display 124. An analysis result is displayed for each rule in the display 124. In the display 124, rule information is necessary in some cases to display an analysis result. With only a rule file, the types of valid data are not ascertained, but a solution can be sought only by referring to the field name 102 of an analysis pattern file.

Figures 13, 14:
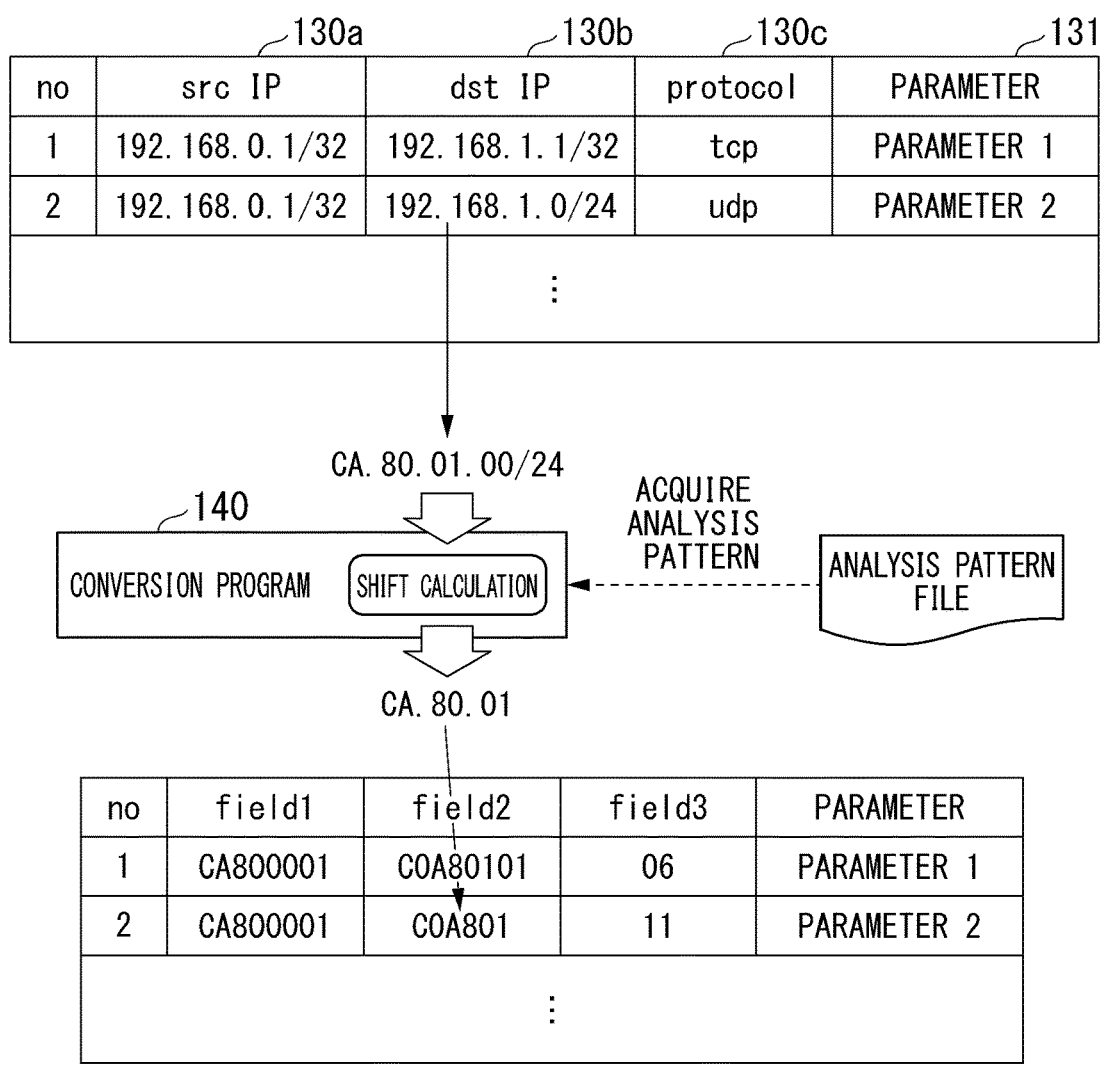
FIG. 13 is a diagram illustrating an example of a rule file used for a traffic monitoring system.
FIG. 14 is a diagram illustrating an overview of a conversion program used for the traffic monitoring system.

FIG. 13 is a diagram illustrating an example of a rule file used for the traffic monitoring system 120. The rule file includes rule elements 130a to 130c (fields 1 to 3) and a parameter 131. A rule described in this file is registered in the traffic monitoring system 120.

In the rule elements 130a to 130c, a value of the valid data may be recorded in hexadecimal. This is because description specialized for specific valid data is difficult due to registration of any valid data in the analysis parameters 101a to 101c. If a special description is allowed, a rule registration process is likely to be complicated.

Values registered in the rule elements 130a to 130c will be described using 1Pv4 as an example. When the IP address desired to be registered is "192.168.0.1," "COA80001" is recorded. When a sub-network such as "192.168.0.0/24" is desired to be registered, "COA800" may be recorded.

In the parameter 131, parameters for the rule matcher 122, the traffic analyzer 123, and the display 124 are described. For example, information regarding a white list, a black list, a packet capturing target, or the like is described with regard to the rule matcher 122. For the traffic analyzer 123, information such as a threshold of a traffic amount or a resolution of jitter or latency measurement is described. For the actioner, a parameter such as an action target is described.

FIG. 14 is a diagram illustrating an overview of a conversion program 140 used for the traffic monitoring system 120. As described above, it is desirable to register a rule in a rule file in hexadecimal. However, such a registration method deteriorates visibility. Accordingly, a rule file generated by a user using the conversion program 140 may be converted into a rule file (HEX) dedicated for a system. Such a conversion program may be executed by, for example, the setting controller 126.

The conversion program 140 inputs a rule file and an analysis pattern file. The conversion program 140 converts the rule elements 130a to 130c in hexadecimal. When data lengths of the analysis patterns and the rule elements 130a to 130c are not consistent, the conversion program 140 may shift the rule elements 130a to 130c so that the data lengths of the analysis patterns are matched.

Figure 15:
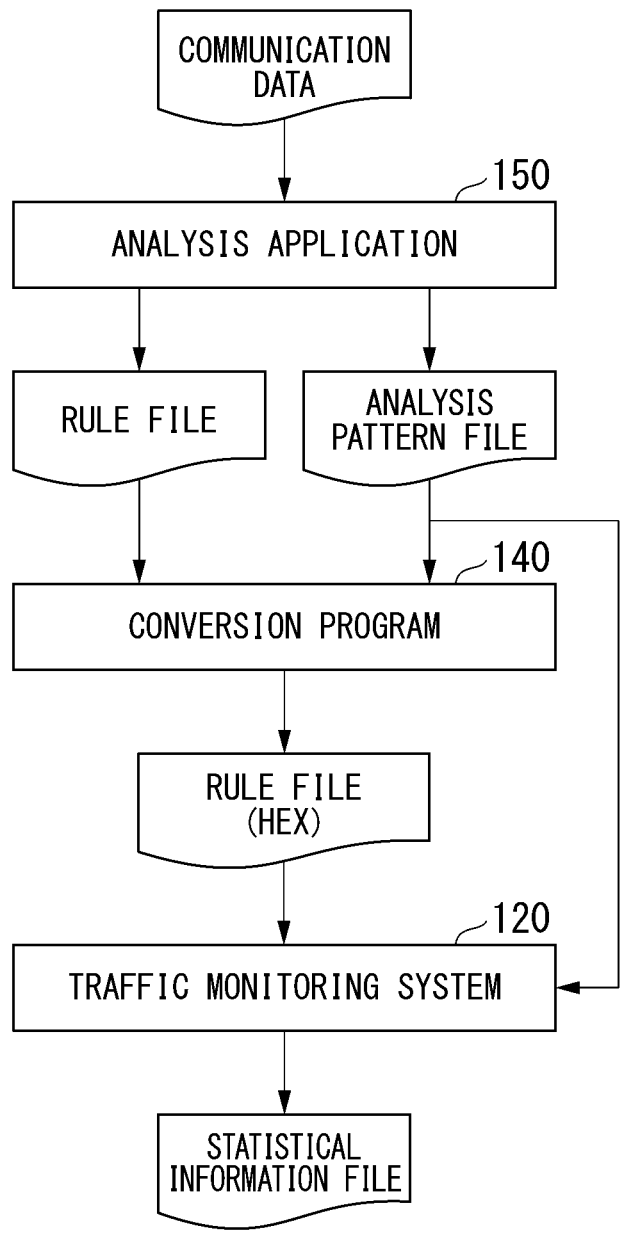
FIG. 15 is a diagram illustrating an example of a running procedure of the traffic monitoring system.

FIG. 15 is a diagram illustrating an example of a running procedure of the traffic monitoring system 120. This procedure may be all performed by an information processing device (for example, the traffic monitoring system 120) or may be partially performed by a person. In the procedure, a packet is first acquired from a monitoring target network and is analyzed using the packet analysis application 150 to determine the acquired valid data. Thereafter, the analysis pattern is registered in an analysis pattern file and a rule is registered in a rule file. The registration process may be automatically or manually performed in association with the packet analysis application 150. At this time point, the rule file may be a description with high visibility. The generated analysis pattern file and the rule file are input to the conversion program 140 and a rule file (HEX) dedicated for a system is generated. Thereafter, the analysis pattern file and the rule file (HEX) are input to the traffic monitoring system 120, the registration process is performed, and then the traffic monitoring is started. A monitoring result is output to a statistical information file.

The header analyzer 20 that has such a configuration can acquire data necessary for any protocol by setting the offset and the data length from the head of a packet. That is, it is possible to considerably reduce labor for a setting necessary to acquire data necessary for communication data of any protocol and perform the setting more easily.

The above-described header analyzer 20 may be configured, for example, using a memory and a processor such as a CPU. Some or all of the functions of the header analyzer 20 may be implemented using hardware such as an application specific integrated circuit (ASIC), a programmable logic device (PLD), or a field programmable gate array (FPGA). The foregoing program may be recorded on a computer-readable recording medium. The computer-readable recording medium is, for example, a portable medium such as a flexible disc, a magneto-optical disc, a ROM, a CD-ROM, or a semiconductor storage device (for example, a solid state drive (SSD)) or a storage device such as a hard disk or a semiconductor storage device embedded in a computer system. The foregoing program may be transmitted via an electrical communication line.

While preferred embodiments of the invention have been described and illustrated above, it should be understood that these are exemplary examples of the invention and are not to be considered as limiting. The present invention also includes designs and the like that do not depart from the gist thereof.

EXPLANATION OF REFERENCES

10 Packet
11 Valid header
12a to 12c Offset
13a to 13c Data length
14a to 14c Valid data
15 Margin
20 Header analyzer
21a to 21c Data masker
22a to 22c Valid data acquirer
23 Operation OR calculator
24 Bit expander
25 Selector controller
30a to 30f Data segmentation portion
31a to 31d Selector
70 Data retentioner
71 Storage
100 Pattern number
101a to 101c Analysis parameter
102 Field name
121 Packet receiver
122 Rule matcher
123 Traffic analyzer
124 Display
125 Actioner
126 Setting controller
130a to 130c Rule element
131 Parameter 140 Conversion program
150 Packet analysis application

What is claimed is:

1. A data acquisition device comprising:
a valid data acquirer configured to acquire valid data from communication data based on an analysis parameter including an offset from a head of the communication data to the valid data and a data length of the valid data and output the acquired valid data;
a data masker configured to mask a bit of the communication data other than valid data; and
a data retentioner configured to retain the communication data and output the communication data to the data masker throughout a plurality of cycles,
wherein the data masker masks the bit of the communication data other than the valid data by using mask data in accordance with the plurality of cycles, and
the valid data acquirer acquires the valid data from the communication data masked by the data masker.

2. The data acquisition device according to claim 1,
wherein the valid data acquirer acquires the valid data by dividing the communication data into a plurality of pieces of data and acquiring one piece of data among the plurality of divided pieces of data each including a region.

3. The data acquisition device according to claim 1,
wherein the valid data acquirer performs a process of dividing the communication data into a plurality of pieces of data and acquiring one piece of data among the plurality of divided pieces of data each including a region, and
wherein the valid data is acquired by performing, once or a plurality of times, a process of further dividing the acquired one piece of data into a plurality of pieces of data and acquiring one piece of data among the plurality of divided pieces of data each including a region.

4. The data acquisition device according to claim 1,
wherein the valid data acquirer acquires a plurality of pieces of valid data from one piece of communication data, and
wherein the data acquisition device further comprises an operation OR calculator configured to generate a valid header by performing operation OR calculation on the plurality of pieces of valid data.

5. The data acquisition device according to claim 1,
wherein the valid data acquirer acquires a plurality of pieces of valid data from one piece of communication data, and generates data for each valid data by arranging each of the acquired valid data so that positions of the acquired valid data do not overlap in a predetermined length of data, and
the data acquisition device further comprises an operation OR calculator configured to generate a valid header by performing operation OR calculation of data for each valid data generated by the valid data acquirer.

6. A data acquisition method comprising:
acquiring a plurality of pieces of valid data from one piece of communication data based on an analysis parameter including an offset from a head of the communication data to the valid data and a data length of the valid data by a data acquisition device;
generating data for each valid data by arranging each of the acquired valid data so that positions of the acquired valid data do not overlap in a predetermined length of data;
generating a valid header by performing operation OR calculation of data for each valid data;
outputting the acquired valid data by the data acquisition device;
masking a bit of the communication data other than valid data; and
retaining the communication data and outputting the communication data throughout a plurality of cycles,
wherein the bit of the communication data other than the valid data is masked by using mask data in accordance with the plurality of cycles, and
the valid data is acquired from the communication data masked by the data masker.

* * * * *